United States Patent
Zhang et al.

(10) Patent No.: US 12,396,009 B2
(45) Date of Patent: Aug. 19, 2025

(54) METHOD AND APPARATUS FOR PHYSICAL DOWNLINK CONTROL CHANNEL REPETITION

(71) Applicant: Lenovo (Beijing) Ltd., Beijing (CN)

(72) Inventors: Yuantao Zhang, Beijing (CN); Hongmei Liu, Beijing (CN); Zhi Yan, Beijing (CN); Yingying Li, Beijing (CN); Haiming Wang, Beijing (CN)

(73) Assignee: Lenovo (Beijing) Ltd., Beijing (CN)

( * ) Notice: Subject to any disclaimer, the term of this patent is extended or adjusted under 35 U.S.C. 154(b) by 410 days.

(21) Appl. No.: 17/925,226

(22) PCT Filed: May 15, 2020

(86) PCT No.: PCT/CN2020/090516
§ 371 (c)(1),
(2) Date: Nov. 14, 2022

(87) PCT Pub. No.: WO2021/227008
PCT Pub. Date: Nov. 18, 2021

(65) Prior Publication Data
US 2023/0232416 A1    Jul. 20, 2023

(51) Int. Cl.
*H04W 72/232* (2023.01)
*H04L 1/08* (2006.01)

(52) U.S. Cl.
CPC ............ *H04W 72/232* (2023.01); *H04L 1/08* (2013.01)

(58) Field of Classification Search
CPC ....... H04L 1/08; H04L 5/0044; H04L 5/0053; H04W 72/232; H04W 48/12; H04W 48/16
See application file for complete search history.

(56) References Cited

U.S. PATENT DOCUMENTS

| | | | |
|---|---|---|---|
| 2016/0353440 A1* | 12/2016 | Lee | H04W 52/48 |
| 2019/0306827 A1 | 10/2019 | Agiwal et al. | |
| 2020/0092833 A1 | 3/2020 | Agiwal et al. | |
| 2020/0146107 A1* | 5/2020 | Xiong | H04W 76/27 |
| 2020/0177337 A1* | 6/2020 | Li | H04W 48/10 |
| 2021/0250929 A1* | 8/2021 | Sakhnini | H04W 48/12 |
| 2023/0171703 A1* | 6/2023 | Park | H04W 72/232 370/318 |

(Continued)

FOREIGN PATENT DOCUMENTS

| | | |
|---|---|---|
| CN | 110602731 A | 12/2019 |
| WO | 2020029746 A1 | 2/2020 |

OTHER PUBLICATIONS

PCT/CN2020/090516, "International Preliminary Report on Patentability", PCT Application No. PCT/CN2020/090516, Nov. 24, 2022, 5 pages.

(Continued)

*Primary Examiner* — Khoa Huynh
(74) *Attorney, Agent, or Firm* — FIG. 1 Patents (57) ABSTRACT

The present application relates to a user equipment, a base station, and a method for PDCCH repetition. The base station transmits a MIB corresponding to a SSB to the user equipment. The MIB includes a configuration of search space zero. The user equipment receives the MIB corresponding to the SSB from the base station. The user equipment determines that the configuration of search space zero indicates a PDCCH repetition.

20 Claims, 10 Drawing Sheets

(56) References Cited

U.S. PATENT DOCUMENTS

2023/0189147 A1* 6/2023 Bala .................. H04W 68/02
370/311

OTHER PUBLICATIONS

PCT/CN2020/090516, "International Search Report and Written Opinion", PCT Application No. PCT/CN2020/090516, Feb. 18, 2021, 6 pages.
Spreadtrum Communications, "Discussion on initial access and mobility in NR-U", 3GPP TSG RAN WG1 Meeting #98bis, R1-1910015, Chongqing, China [retrieved Dec. 15, 2022]. Retrieved from the Internet <https://www.3gpp.org/ftp/tsg_ran/WG1_RL1/TSGR1_98b/Docs>., Oct. 2019, 15 Pages.

* cited by examiner

METHOD AND APPARATUS FOR PHYSICAL DOWNLINK CONTROL CHANNEL REPETITION

TECHNICAL FIELD

The present disclosure generally relates to Physical Downlink Control Channel (PDCCH) repetition, and relates more particularly to PDCCH repetition for New Radio apparatus.

BACKGROUND OF THE INVENTION

In conventional network, Physical Downlink Control Channel (PDCCH) detection may be performed between user equipment and base station. For some networks which are compatible with New Radio (NR) protocol, NR apparatus with reduced capabilities (i.e., NR-Light apparatus) may be introduced.

Due to the reduced capabilities, PDCCH coverage of NR-Light apparatus for performing PDCCH detection is inevitably deteriorated. Therefore, configurations for performing PDCCH detection by NR-Light apparatus need to be re-configured. However, specific details of the configurations for the NR-Light apparatus to perform PDCCH detection have not been discussed yet and there are still some issues that need to be solved.

BRIEF SUMMARY OF THE INVENTION

One embodiment of the present disclosure provides a method of a user equipment. The method includes: receiving a Master Information Block (MIB) corresponding to a Synchronization Signal Block (SSB) from a base station, wherein the MIB includes a configuration of search space zero; and determining that the configuration of search space zero indicates a Physical Downlink Control Channel (PDCCH) repetition.

Another embodiment of the present disclosure provides a method of a base station. The method includes: transmitting an MIB corresponding to a SSB to a user equipment, wherein the MIB includes a configuration of search space zero for the user equipment to determine that the configuration of search space zero indicates a PDCCH repetition.

Yet another embodiment of the present disclosure provides an apparatus. According to an embodiment of the present disclosure, the apparatus includes: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions are configured to, with the at least one processor, cause the apparatus to perform a method according to an embodiment of the present disclosure.

BRIEF DESCRIPTION OF THE DRAWINGS

In order to describe the manner in which advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION OF THE INVENTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Figure 1:
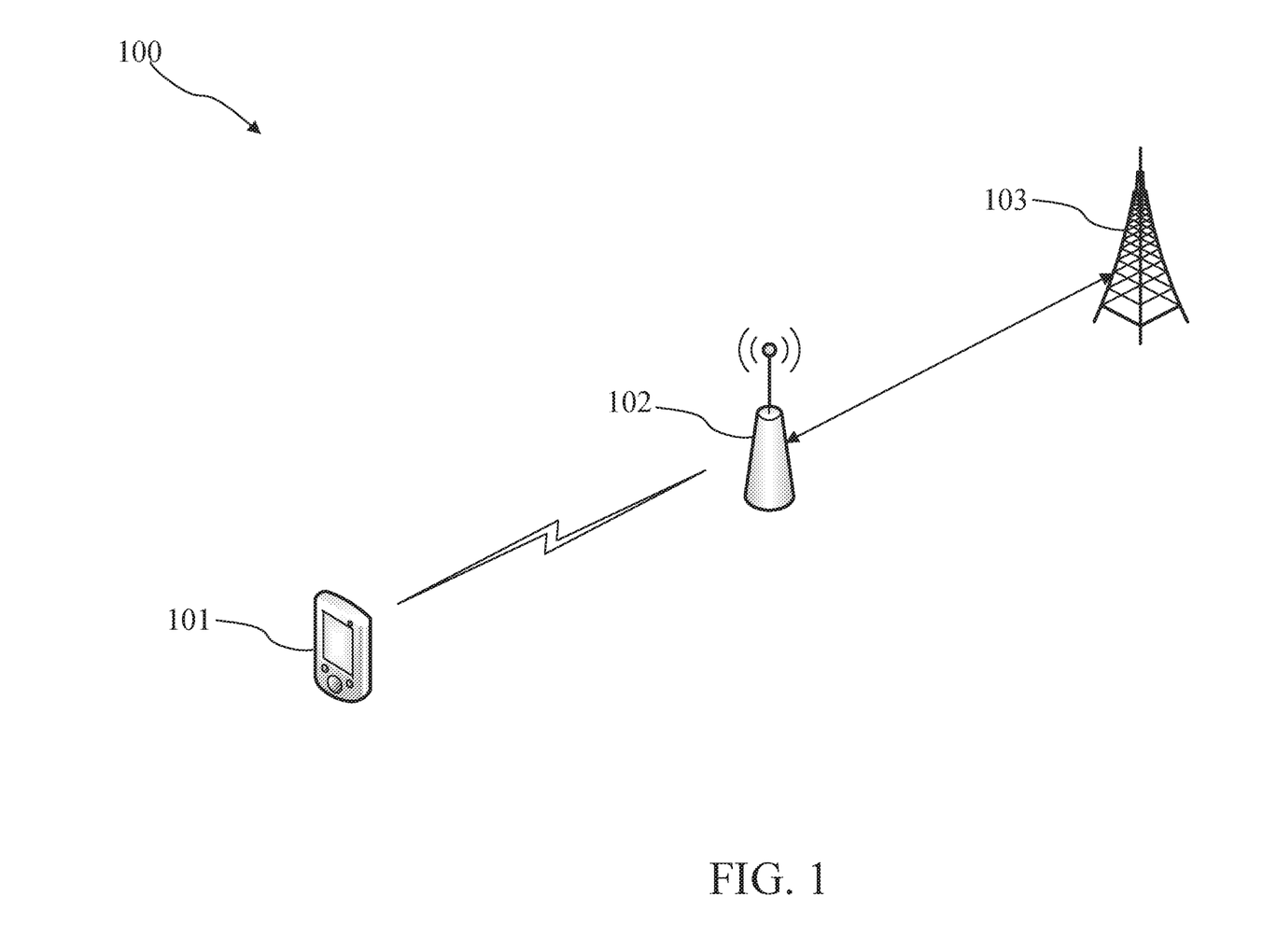
FIG. 1 illustrates a wireless communication system according to an embodiment of the present disclosure.

Referring to FIG. 1, a wireless communication system 100 may include a user equipment (UE) 101, a base station (BS) 102 and a core network (CN) 103. Although a specific number of UE 101, BS 102 and CN 103 are depicted in FIG. 1, it is contemplated that any number of UEs 101, BSs 102 and CNs 103 may be included in the wireless communication system 100.

CN 103 may include a core Access and Mobility management Function (AMF) entity. BS 102, which may communicate with CN 103, may operate or work under the control of the AMF entity. CN 103 may further include a User Plane Function (UPF) entity, which communicatively coupled with the AMF entity.

BS 102 may be distributed over a geographic region. In certain embodiments of the present application, BS 102 may also be referred to as an access point, an access terminal, a base, a base unit, a macro cell, a Node-B, an evolved Node B (eNB), a gNB, a Home Node-B, a relay node, or a device, or described using other terminology used in the art. BS 102 is generally part of a radio access network that may include one or more controllers communicably coupled to one or more corresponding BS(s).

UE 101 may include, for example, but is not limited to, computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), Internet of Thing (IoT) devices, or the like.

According to some embodiments of the present application, UE 101 may include, for example, but is not limited to, a portable wireless communication device, a smart phone, a cellular telephone, a flip phone, a device having a subscriber identity module, a personal computer, a selective call receiver, a wireless sensor, a monitoring device, or any other device that is capable of sending and receiving communication signals on a wireless network.

In some embodiments of the present application, UE 101 may include, for example, but is not limited to, wearable devices, such as smart watches, fitness bands, optical head-mounted displays, or the like. Moreover, UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art. UE 101 may communicate directly with BS 102 via uplink communication signals.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3GPP-based network, a 3GPP 5G network, a satellite communications network, a high altitude platform network, and/or other communications networks.

In some embodiments of the present application, the wireless communication system 100 is compatible with the 5G New Radio (NR) of the 3GPP protocol or the 5G NR-light of the 3GPP protocol, wherein BSs 102 transmit data using an OFDM modulation scheme on the downlink (DL) and UE 101 transmit data on the uplink (UL) using a single-carrier frequency division multiple access (SC-FDMA) or OFDM scheme. More generally, however, the wireless communication system 100 may implement some other open or proprietary communication protocols, for example, WiMAX, among other protocols.

In some embodiments of the present application, BS 102 may communicate using other communication protocols, such as the IEEE 802.11 family of wireless communication protocols. Further, in some embodiments of the present application, BS 102 may communicate over licensed spectrums, whereas in other embodiments BS 102 may communicate over unlicensed spectrums. The present application is not intended to be limited to the implementation of any particular wireless communication system architecture or protocol. In yet some embodiments of present application, BS 102 may communicate with UE 101 using the 3GPP 5G protocols.

According to some existed agreements, UE 101 and BS 102 included in the wireless communication system 100 may be compatible with NR-Light of the 3GPP protocol. Due to the reduced capabilities, Physical Downlink Control Channel (PDCCH) coverage of NR-Light apparatus for performing PDCCH detection is inevitably deteriorated. Therefore, technology of PDCCH repetition may be introduced. However, when detecting PDCCH for search space zero, operations for PDCCH repetition need to be carefully designed since UE 101 does not know the corresponding frame structure.

Figure 2:
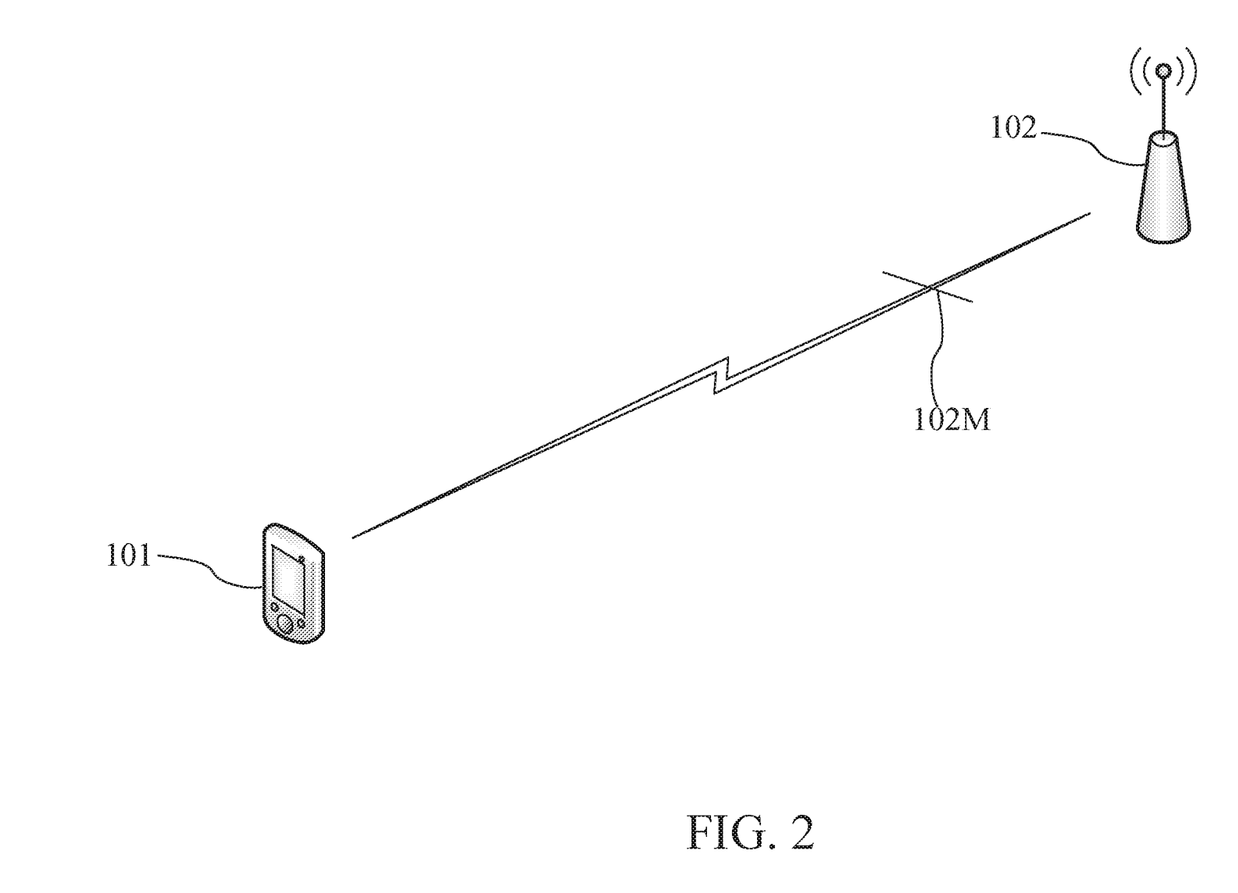
FIG. 2 illustrates transmission of information in a wireless communication system according to an embodiment of the present disclosure.

In some embodiments, a configuration of search space zero may be used for UE 101 to determine whether to enable PDCCH repetition for search space zero. In detail, referring to FIG. 2, BS 102 may broadcast a Master Information Block (MIB) 102M to UE 101. The MIB 102M may correspond to a Synchronization Signal Block (SSB). The MIB 102M may include a configuration of search space zero. The configuration of search space zero may be used to indicate whether a PDCCH repetition is enabled for search space zero.

Figure 3A:
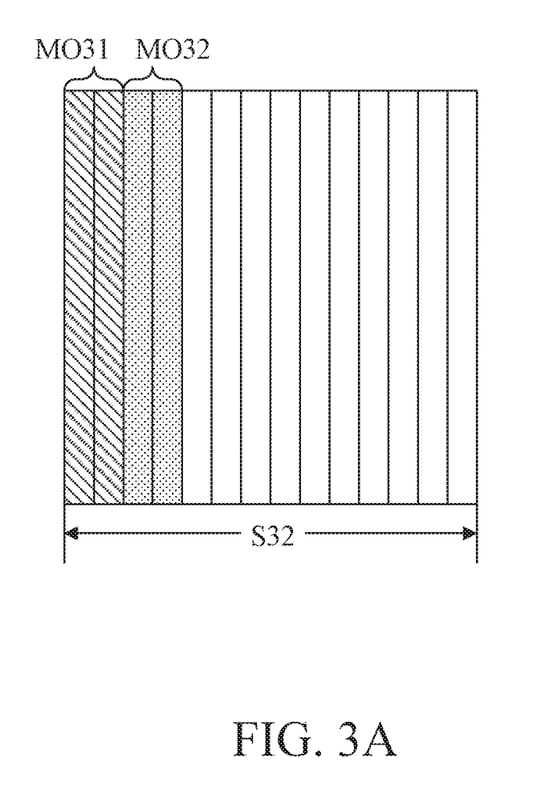
FIG. 3A is a schematic view of DCI transmission according to an embodiment of the present disclosure.

Please refer to FIG. 3A, in some embodiments, when the configuration of search space zero is used to indicate that the PDCCH repetition is enabled for search space zero, BS 102 may transmit Downlink Control Information (DCI) in a first PDCCH monitoring occasion MO31, and may repeatedly transmit DCI in a second PDCCH monitoring occasion MO32. A PDCCH monitoring occasion may correspond to a CORESET that is associated with search space zero.

In some implementations, the second PDCCH monitoring occasion MO32 may follow the first PDCCH monitoring occasion MO31. The first PDCCH monitoring occasion MO31 and the second PDCCH monitoring occasion MO32 may be within a first slot S31. Accordingly, UE 101 may detect DCI in the first PDCCH monitoring occasion MO31 within the first slot S31, and may repeatedly detect DCI in the second PDCCH monitoring occasion MO32 within the first slot S31.

Figure 3B:
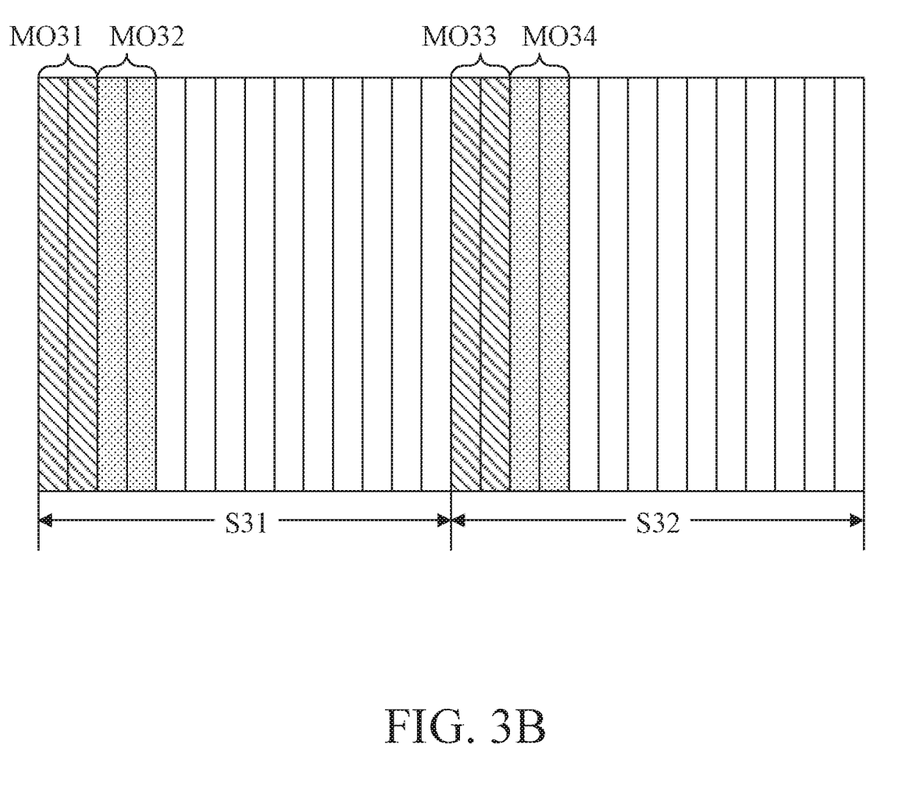
FIG. 3B is a schematic view of DCI transmission according to an embodiment of the present disclosure.

Please refer to FIG. 3B, in some embodiments, DCI may be repeatedly transmitted in either slot out of a set of consecutive slots. Particularly, BS 102 may transmit DCI in a third PDCCH monitoring occasion MO33, and may repeatedly transmit DCI in a fourth PDCCH monitoring occasion MO34.

In some implementations, the fourth PDCCH monitoring occasion MO34 may follow the third PDCCH monitoring occasion MO33. The third PDCCH monitoring occasion MO33 and the fourth PDCCH monitoring occasion MO34 may be within a second slot S32. The second slot S32 may be immediately follow the first slot S31. Accordingly, UE 101, UE 101 may detect DCI in the third PDCCH monitoring occasion MO33 within the second slot S32, and may repeatedly detect DCI in the fourth PDCCH monitoring occasion MO34 within the second slot S32.

In some embodiments, as shown in FIGS. 3A and 3B, each of slots S31 and S32 may include 14 Orthogonal Frequency Division Multiplexing (OFDM) symbols. Each of the PDCCH monitoring occasions MO31 to MO34 may include 2 OFDM symbols. DCI transmitted in the PDCCH monitoring occasions MO31 to MO34 may correspond to the same SSB. From implementation, BS 102 may select one slot with the PDCCH monitoring occasions MO31 and MO32, or another slot with the PDCCH monitoring occasions MO33 and MO34 to transmit DCI for the corresponding SSB.

In some embodiments, based on the configuration of search space zero, BS 102 may repeatedly transmit DCI in either the PDCCH monitoring occasions MO31 and MO32, or the PDCCH monitoring occasions MO33 and MO34, and UE 101 may repeatedly detect DCI in the PDCCH monitoring occasions MO31 to MO34. When detecting DCI, UE 101 may receive DCI from BS 102. DCI may correspond to a System Information Block 1 (SIB1) and may include scheduling information of Physical Downlink Shared Channel (PDSCH) corresponding to the SIB1. Then, BS 102 may transmit downlink data according to the scheduling information of PDSCH. Subsequently, UE 101 may receive downlink data via PDSCH according to the scheduling information of PDSCH.

In some embodiments, because the number of symbols used for transmitting DCI within one slot may be equal to or greater than 4, the downlink data via PDSCH may be start from at least fifth symbol of corresponding slot. Accordingly, the scheduling information of PDSCH may indicate that an index of a starting OFDM symbol is not less than 4. In detail, when the index of the starting OFDM symbol is N, it means that the downlink data via PDSCH may start from the $(N+1)_{th}$ OFDM symbol. For example, when the index of the starting OFDM symbol is 4, the downlink data via PDSCH starts from the $(4+1)_{th}$ OFDM symbol.

For indicating that the index of the starting OFDM symbol is not less than 4, different PDSCH time domain resource allocation tables may be referred. In detail, the scheduling information may comply with PDSCH time domain resource allocation which corresponds to type B of PDSCH mapping type in a default PDSCH time domain resource allocation table.

In some implementation, the default PDSCH time domain resource allocation table may be as follows:

| Row | Dmrs-Type A-Position | PDSCH mapping Type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 | where $K_0$ represents the slot offset between slot for PDCCH and slot for PDSCH (if $K_0=0$, PDCCH and PDSCH is within the same slot), S represents the index of the starting OFDM symbol and L represents number of OFDM symbol(s) of PDSCH duration.

Further, after receiving DCI which includes the scheduling information, UE 101 may be informed of using the default PDSCH time domain resource allocation table, and may refer to Type B of PDSCH mapping type in the default PDSCH time domain resource allocation table.

For example, when DCI include the scheduling information of Row 6 and dmrs-Type A-Position is 3, it indicates that an index S of a starting OFDM symbol is 10 and a number L of OFDM symbols of PDSCH duration is 4. Accordingly, the downlink data via PDSCH starts from the $(10+1)_{th}$ OFDM symbol and the number of OFDM symbols of PDSCH duration for transmitting downlink data is 4.

In some implementations, the default PDSCH time domain resource allocation table may be as follows:

| Row | Dmrs-Type A-Position | PDSCH mapping Type | $K_0$ | S | L |
|---|---|---|---|---|---|
| 1 | 2 | Type B | 0 | 4 | 10 |
|   | 3 | Type B | 0 | 5 | 9 |
| 2 | 2 | Type B | 0 | 4 | 8 |
|   | 3 | Type B | 0 | 5 | 7 |
| 3 | 2 | Type B | 0 | 4 | 6 |
|   | 3 | Type B | 0 | 5 | 5 |
| 4 | 2 | Type B | 0 | 4 | 4 |
|   | 3 | Type B | 0 | 5 | 3 |
| 5 | 2 | Type B | 0 | 4 | 2 |
|   | 3 | Type B | 0 | 5 | 2 |
| 6 | 2 | Type B | 0 | 6 | 8 |
|   | 3 | Type B | 0 | 7 | 7 |
| 7 | 2 | Type B | 0 | 6 | 6 |
|   | 3 | Type B | 0 | 7 | 5 |
| 8 | 2 | Type B | 0 | 6 | 4 |
|   | 3 | Type B | 0 | 7 | 3 |
| 9 | 2 | Type B | 0 | 6 | 2 |
|   | 3 | Type B | 0 | 7 | 2 |
| 10 | 2 | Type B | 0 | 8 | 6 |
|   | 3 | Type B | 0 | 9 | 5 |
| 11 | 2 | Type B | 0 | 8 | 4 |
|   | 3 | Type B | 0 | 9 | 3 |
| 12 | 2 | Type B | 0 | 8 | 2 |
|   | 3 | Type B | 0 | 9 | 2 |
| 13 | 2 | Type B | 0 | 10 | 4 |
|   | 3 | Type B | 0 | 11 | 3 |
| 14 | 2 | Type B | 0 | 10 | 2 |
|   | 3 | Type B | 0 | 11 | 2 |
| 15 | 2, 3 | Type B | 0 | 12 | 2 |
| 16 | Reserved | | | | | where $K_0$ represents the slot offset between slot for PDCCH and slot for PDSCH (if $K_0=0$, PDCCH and PDSCH is within the same slot), S represents the index of the starting OFDM symbol and L represents number of OFDM symbol(s) of PDSCH duration.

In these implementations, types of PDSCH mapping type of the default PDSCH time domain resource allocation table may consist of type B of PDSCH mapping type. In other words, types of PDSCH mapping type of the default PDSCH time domain resource allocation table may be only related to type B of PDSCH mapping type. Further, L may be a natural number within 2 to 10, which means that number of OFDM symbol(s) of PDSCH duration may be 2, 3, 4, 5, 6, 7, 8, 9 or 10 based on demand.

For example, when DCI include the scheduling information of Row 11 and dmrs-Type A-Position is 3, it indicates that an index S of a starting OFDM symbol is 9 and a number L of OFDM symbols of PDSCH duration is 3. Accordingly, the downlink data via PDSCH starts from the $(9+1)_{th}$ OFDM symbol and the number of OFDM symbols of PDSCH duration for transmitting downlink data is 3.

In some implementation, the default PDSCH time domain resource allocation table may be as follows:

| Row | Dmrs-Type A-Position | PDSCH mapping Type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |

-continued

| Row | Dmrs-Type A-Position | PDSCH mapping Type | $K_0$ | S | L |
|---|---|---|---|---|---|
| 7 | 2 | Type B | 0 | 4 | 4 |
|   | 3 | Type B | 0 | 6 | 4 |
| 8 | 2 | Type B | 0 | 5 | 7 |
|   | 3 | Type B | 0 | 4 | 10 |
| 9 | 2 | Type B | 0 | 5 | 2 |
|   | 3 | Type B | 0 | 6 | 8 |
| 10 | 2 | Type B | 0 | 9 | 2 |
|   | 3 | Type B | 0 | 4 | 9 |
| 11 | 2 | Type B | 0 | 12 | 2 |
|   | 3 | Type B | 0 | 6 | 7 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2 | Type B | 0 | 4 | 7 |
|   | 3 | Type B | 0 | 4 | 6 |
| 16 | 2 | Type B | 0 | 8 | 4 |
|   | 3 | Type B | 0 | 6 | 6 | where $K_0$ represents the slot offset between slot for PDCCH and slot for PDSCH (if $K_0=0$, PDCCH and PDSCH is within the same slot), S represents the index of the starting OFDM symbol and L represents number of OFDM symbol(s) of PDSCH duration. In these implementations, the table may be extended with more type B resource allocations, which include different combinations of the parameters, to enable more flexible resource allocation.

In some embodiments, if PDCCH repetition is not configured, a legacy default PDSCH resource allocation table may be used for scheduling PDSCH, otherwise a different default PDSCH resource allocation table may be used. In some embodiments, which default PDSCH resource allocation table is used may depend on the configuration.

Further, after receiving DCI which includes the scheduling information, UE 101 may be informed of using the default PDSCH time domain resource allocation table, and may refer to Type B of PDSCH mapping type in the default PDSCH time domain resource allocation table.

For example, when DCI include the scheduling information of Row 9 and dmrs-Type A-Position is 3, it indicates that an index S of a starting OFDM symbol is 6 and a number L of OFDM symbols of PDSCH duration is 8. Accordingly, the downlink data via PDSCH starts from the $(6+1)_{th}$ OFDM symbol and the number of OFDM symbols of PDSCH duration for transmitting downlink data is 8.

It should be noted that the values of parameters of the above default PDSCH time domain resource allocation tables are not intended to be limited to any specific values. The values of parameters of the above default PDSCH time domain resource allocation tables may be adjusted based on demand.

Figure 4:
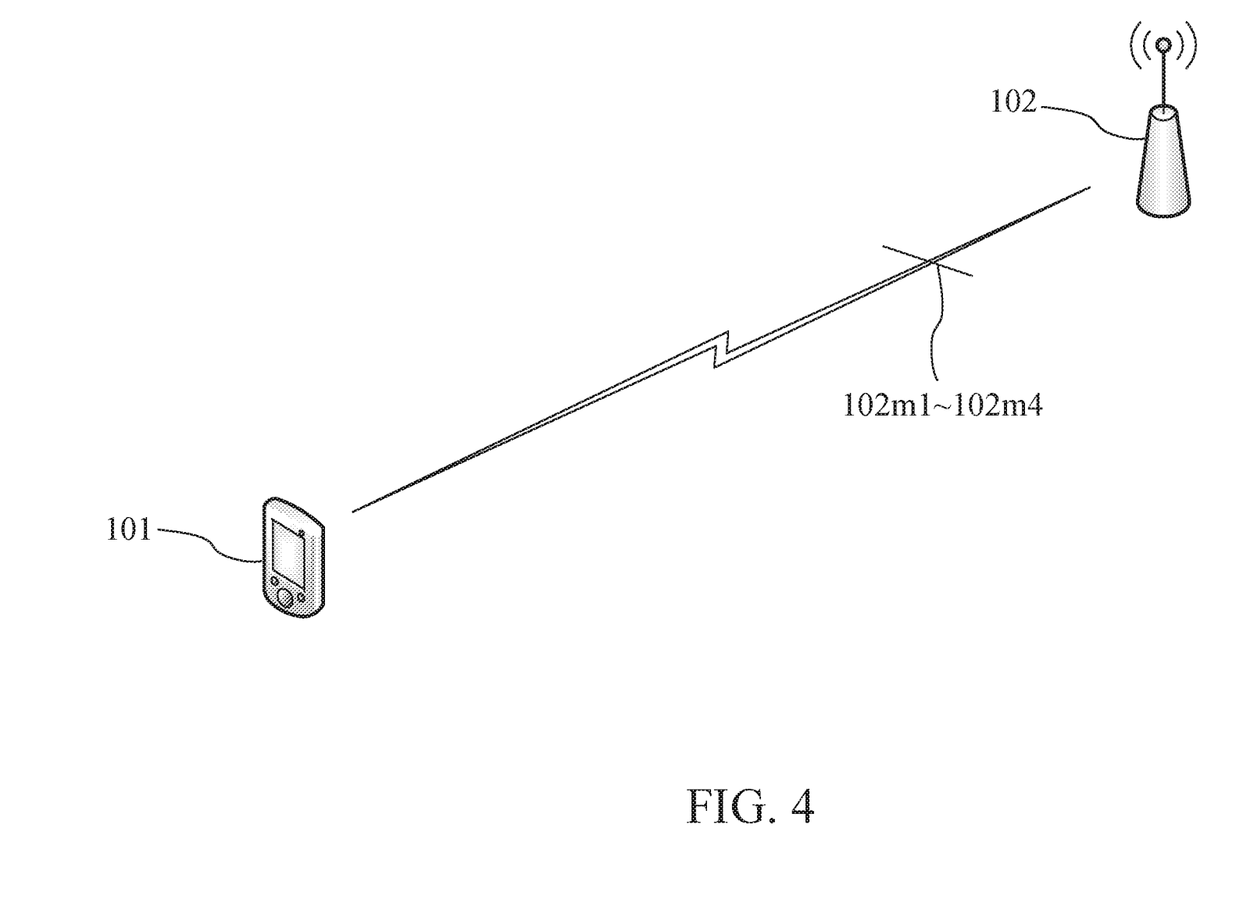
FIG. 4 illustrates transmission of information in a wireless communication system according to an embodiment of the present disclosure.

In some embodiments, PDCCH repetition may be used for different SSBs corresponding to different SSB beams. In detail, referring to FIG. 4, BS 102 may broadcast MIB 102m1 to 102m4 to UE 101. The MIB 102m1 to 102m4 may respectively correspond to SSB1 of first SSB beam, SSB2 of second SSB beam, SSB3 of third SSB beam and SSB4 of fourth SSB beam. The MIB 102m1 to 102m4 may include configurations of search space zero. The configurations of search space zero may be used to indicate whether a PDCCH repetition is enabled for search space zero.

Figure 5:
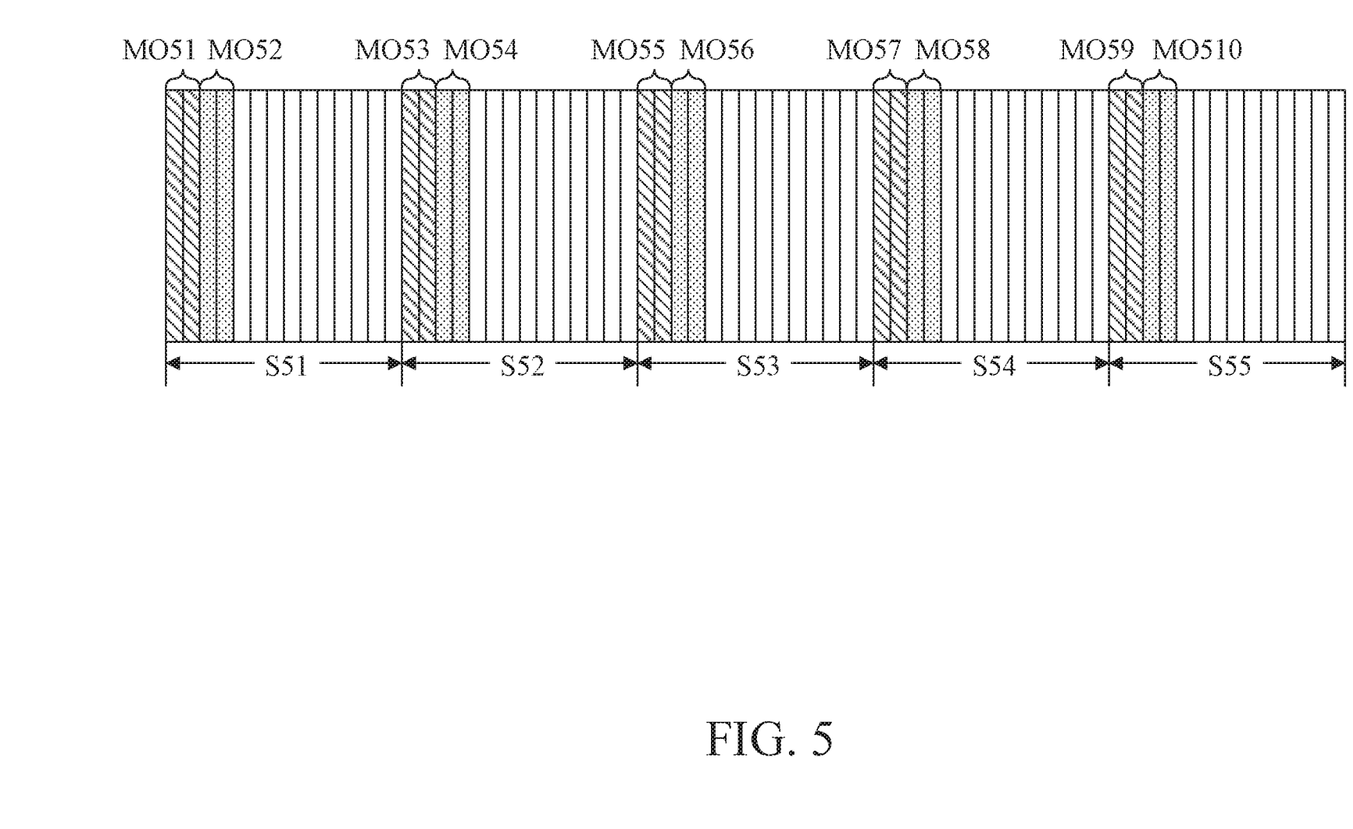
FIG. 5 is a schematic view of DCI transmission according to an embodiment of the present disclosure.

Please refer to FIG. 5, in some embodiments, when the configurations of search space zero are used to indicate that the PDCCH repetition is enabled for search space zero, BS 102 may transmit DCI for SSB1 in a first PDCCH monitoring occasion MO51, and may repeatedly transmit DCI for SSB1 in a second PDCCH monitoring occasion MO52.

In some implementations, the second PDCCH monitoring occasion MO52 may follow the first PDCCH monitoring occasion MO51. The first PDCCH monitoring occasion MO51 and the second PDCCH monitoring occasion MO52 may be within a first slot S51. Accordingly, UE 101 may detect DCI for SSB1 in the first PDCCH monitoring occasion MO51 within the first slot S51, and may repeatedly detect DCI for SSB1 in the second PDCCH monitoring occasion MO52 within the first slot S51.

Further, DCI for SSB1 may be repeatedly transmitted in either slot out of a set of consecutive slots. Particularly, BS 102 may transmit DCI for SSB1 in a third PDCCH monitoring occasion MO53, and may repeatedly transmit DCI for SSB1 in a fourth PDCCH monitoring occasion MO54.

In some implementations, the fourth PDCCH monitoring occasion MO54 may follow the third PDCCH monitoring occasion MO53. The third PDCCH monitoring occasion MO53 and the fourth PDCCH monitoring occasion MO54 may be within a second slot S52. The second slot S52 may be immediately follow the first slot S51. Accordingly, UE 101 may detect DCI for SSB1 in the third PDCCH monitoring occasion MO53 within the second slot S52, and may detect DCI for SSB1 the fourth PDCCH monitoring occasion MO54 within the second slot S52.

In these embodiments, PDCCH monitoring occasions for transmitting DCI for SSB1 and PDCCH monitoring occasions for transmitting DCI for SSB2 may be partially overlapped. In particular, BS 102 may transmit DCI for SSB2 in the third PDCCH monitoring occasion MO53, and may repeatedly transmit DCI for SSB2 in the fourth PDCCH monitoring occasion MO54. Accordingly, UE 101 may detect DCI for SSB2 in the third PDCCH monitoring occasion MO53, and may repeatedly detect DCI for SSB2 in the fourth PDCCH monitoring occasion MO54.

Further, DCI for SSB2 may be repeatedly transmitted in either slot out of a set of consecutive slots. Particularly, BS 102 may transmit DCI for SSB2 in a fifth PDCCH monitoring occasion MO55, and may repeatedly transmit DCI for SSB2 in a sixth PDCCH monitoring occasion MO56.

In some implementations, the fifth PDCCH monitoring occasion MO55 may follow the sixth PDCCH monitoring occasion MO56. The fifth PDCCH monitoring occasion MO55 and the sixth PDCCH monitoring occasion MO56 may be within a third slot S53. The third slot S53 may be immediately follow the second slot S52. Accordingly, UE 101 may detect DCI for SSB2 in the fifth PDCCH monitoring occasion MO55 within the third slot S53, and may repeatedly detect the sixth PDCCH monitoring occasion MO56 within the third slot S53.

In these embodiments, PDCCH monitoring occasions for transmitting DCI for SSB2 and PDCCH monitoring occasions for transmitting DCI for SSB3 may be partially overlapped. In particular, BS 102 may transmit DCI for SSB3 in the fifth PDCCH monitoring occasion MO55, and may repeatedly transmit DCI for SSB3 in the sixth PDCCH monitoring occasion MO56. Accordingly, UE 101 may detect DCI for SSB3 in the fifth PDCCH monitoring occasion MO55, and may detect DCI for SSB3 in the sixth PDCCH monitoring occasion MO56.

Further, DCI for SSB3 may be repeatedly transmitted in either slot out of a set of consecutive slots. Particularly, BS 102 may transmit DCI for SSB3 in a seventh PDCCH monitoring occasion MO57, and may repeatedly transmit DCI for SSB3 in a eighth PDCCH monitoring occasion MO58.

In some implementations, the seventh PDCCH monitoring occasion MO57 may follow the eighth PDCCH monitoring occasion MO58. The seventh PDCCH monitoring occasion MO57 and the eighth PDCCH monitoring occasion MO58 may be within a fourth slot S54. The fourth slot S54 may be immediately follow the third slot S53. Accordingly, UE 101 may detect DCI for SSB3 in the seventh PDCCH monitoring occasion MO57 within the fourth slot S54, and may repeatedly detect DCI for SSB3 in the eighth PDCCH monitoring occasion MO58 within the fourth slot S54.

In these embodiments, PDCCH monitoring occasions for transmitting DCI for SSB3 and PDCCH monitoring occasions for transmitting DCI for SSB4 may be partially overlapped. In particular, BS 102 may transmit DCI for SSB4 in the seventh PDCCH monitoring occasion MO57, and may repeatedly transmit DCI for SSB4 in the eighth PDCCH monitoring occasion MO58. Accordingly, UE 101 may detect DCI for SSB4 in the seventh PDCCH monitoring occasion MO57, and may repeatedly detect DCI for SSB4 in the eighth PDCCH monitoring occasion MO58.

Further, DCI for SSB4 may be repeatedly transmitted in either slot out of a set of consecutive slots. Particularly, BS 102 may transmit DCI for SSB4 in a ninth PDCCH monitoring occasion MO59, and may repeatedly transmit DCI for SSB4 in a tenth PDCCH monitoring occasion MO510.

In some implementations, the ninth PDCCH monitoring occasion MO59 may follow the tenth PDCCH monitoring occasion MO510. The ninth PDCCH monitoring occasion MO59 and the tenth PDCCH monitoring occasion MO510 may be within a fifth slot S55. The fifth slot S55 may be immediately follow the fourth slot S54. Accordingly, UE 101 may detect DCI for SSB4 in the ninth PDCCH monitoring occasion MO59 within the fourth slot S54, and may repeatedly detect DCI for SSB 4 in the tenth PDCCH monitoring occasion MO510.

Figure 6:
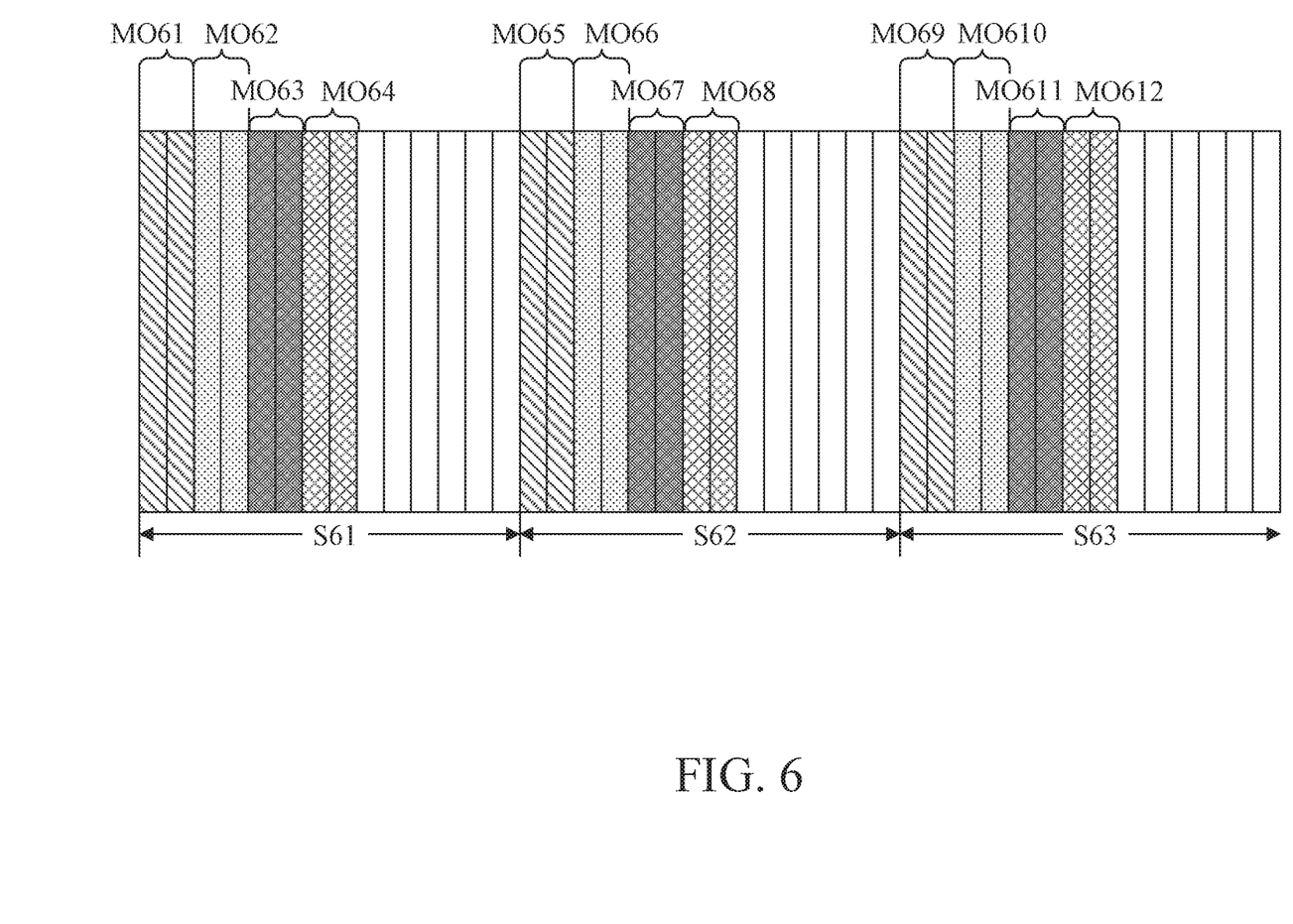
FIG. 6 is a schematic view of DCI transmission according to an embodiment of the present disclosure.

Please refer to FIG. 6, in some embodiments, when the configurations of search space zero are used to indicate that the PDCCH repetition is enabled for search space zero, BS 102 may transmit DCI for SSB1 in a first PDCCH monitoring occasion MO61, and may repeatedly transmit DCI for SSB1 in a second PDCCH monitoring occasion MO62.

Then, BS 102 may transmit DCI for SSB2 in a third PDCCH monitoring occasion MO63, and may repeatedly transmit DCI for SSB2 in a fourth PDCCH monitoring occasion MO64. In some implementations, the PDCCH monitoring occasions MO61 to MO64 may be in sequence within a first slot S61.

Accordingly, UE 101 may detect DCI for SSB1 in the first PDCCH monitoring occasion MO61 within the first slot S61, and may repeatedly detect DCI for SSB1 in the second PDCCH monitoring occasion MO62 within the first slot S61. Then, UE 101 may detect DCI for SSB2 in the third PDCCH monitoring occasion MO63 within the first slot S61, and may repeatedly detect DCI for SSB2 in the fourth PDCCH monitoring occasion MO64 within the first slot S61.

Further, DCI for SSB1 and DCI for SSB2 may be repeatedly transmitted in either slot out of a set of consecutive slots. In particular, BS 102 may transmit DCI for SSB1 in a fifth PDCCH monitoring occasion MO65, and may repeatedly transmit DCI for SSB1 in a sixth PDCCH monitoring occasion MO66. Then, BS 102 may transmit DCI for SSB2 in a seventh PDCCH monitoring occasion MO67, and may repeatedly transmit DCI for SSB2 in an eighth PDCCH monitoring occasion MO68. In some implementations, the PDCCH monitoring occasions MO65 to MO68 may be in sequence within a second slot S62.

Accordingly, UE 101 may detect DCI for SSB1 in the fifth PDCCH monitoring occasion MO65 within the second slot S62, and may repeatedly detect DCI for SSB1 in the sixth PDCCH monitoring occasion MO66 within the second slot S62. Then, UE 101 may detect DCI for SSB2 in the seventh PDCCH monitoring occasion MO67 within the second slot S62, and may repeatedly detect DCI for SSB2 in the eighth PDCCH monitoring occasion MO68 within the second slot S62.

In these embodiments, PDCCH monitoring occasions for transmitting DCI for SSB1 and PDCCH monitoring occasions for transmitting DCI for SSB3 may be partially overlapped. In particular, BS 102 may transmit DCI for SSB3 in the fifth PDCCH monitoring occasion MO65, and may repeatedly transmit DCI for SSB3 in the sixth PDCCH monitoring occasion MO66. Accordingly, UE 101 may detect DCI for SSB3 in the fifth PDCCH monitoring occasion MO65, and may repeatedly detect DCI for SSB3 in the sixth PDCCH monitoring occasion MO66.

Moreover, PDCCH monitoring occasions for transmitting DCI for SSB2 and PDCCH monitoring occasions for transmitting DCI for SSB4 may be partially overlapped. In particular, BS 102 may transmit DCI for SSB4 in the seventh PDCCH monitoring occasion MO67, and may repeatedly transmit DCI for SSB4 in the eighth PDCCH monitoring occasion MO68. Accordingly, UE 101 may detect DCI for SSB4 in the seventh PDCCH monitoring occasion MO67, and may detect DCI for SSB4 in the eighth PDCCH monitoring occasion MO68.

Further, DCI for SSB3 and DCI for SSB4 may be repeatedly transmitted in either slot out of a set of consecutive slots. In particularly, BS 102 may transmit DCI for SSB3 in a ninth PDCCH monitoring occasion MO69, and may repeatedly transmit DCI for SSB3 in a tenth PDCCH monitoring occasion MO610.

Then, BS 102 may transmit DCI for SSB4 in an eleventh PDCCH monitoring occasion MO611, and may repeatedly transmit DCI for SSB4 in a twelfth PDCCH monitoring occasion MO612. In some implementations, the PDCCH monitoring occasions MO69 to MO612 may be in sequence within a third slot S63.

Accordingly, UE 101 may detect DCI for SSB3 in the ninth PDCCH monitoring occasion MO69, and may repeatedly detect DCI for SSB3 in the tenth PDCCH monitoring occasion MO610. Then, UE 101 may detect DCI for SSB4 in the eleventh PDCCH monitoring occasion MO611, and may repeatedly detect DCI for SSB4 in the twelfth PDCCH monitoring occasion MO612.

In some embodiments, time offset may be introduced for detecting SIB1s corresponding to different SSBs. Specifically, there is a set of consecutive slots used for SIB1 transmission for a part of SSBs, while another set of consecutive slots is used for SIB1 transmission for another part of SSBs. Please refer to FIG. 7, three slots S71 to S73 of one frame structure may be used for DCIs and SIB1s of SSB1 to SSB4. After transmission of DCIs, BS 102 may transmit SIB1 for SSB1 within the first slot S1 of a frame structure, and may transmit SIB1 for SSB2 within the second slot S2 of the frame structure. Then, after a time offset TO, BS 102 may transmit SIB1 for SSB3 within the first slot S1 of another frame structure, and may transmit SIB1 for SSB4 within the second slot S2 of the another frame structure.

Figure 7:
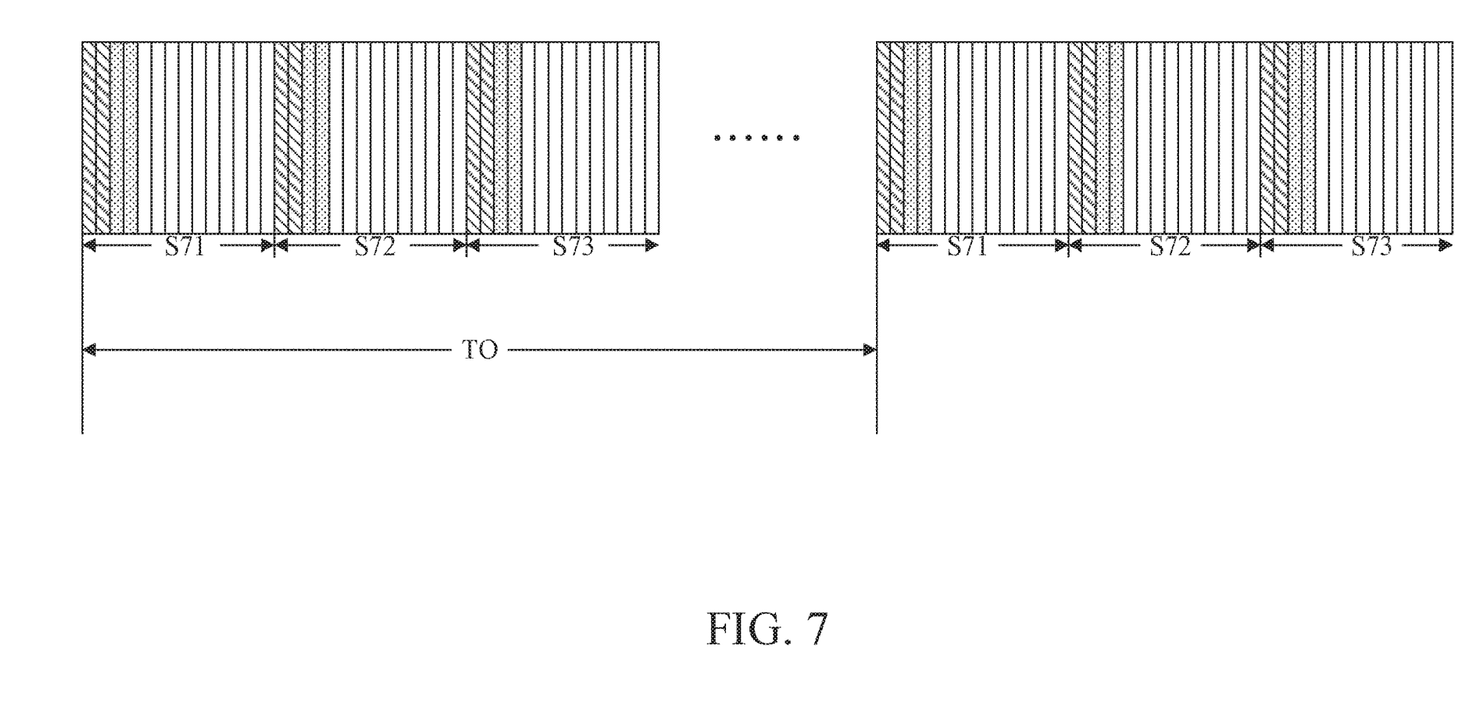
FIG. 7 is a schematic view of time offset between slots of different frames according to an embodiment of the present disclosure.

In some implementations, the time offset may be N*20 ms between a starting OFDM symbol of the first slot S1 of the frame structure and a starting OFDM symbol of the first slot S1 of the another frame structure, where N represents a natural number.

In some embodiments, a PDCCH candidate is associated with an aggregation level and a repetition number of the PDCCH repetition. In detail, the PDCCH candidates may be defined based on number M of PDCCH monitoring occasions. The PDCCH candidate may be associated with {AL, R}, where AL represents an aggregation level defined in PDCCH monitoring occasion, and R represents a repetition number for AL. In some implementations, R may equal to M.

It should be noted that four SSBs are used to demonstrate the above embodiments and implementations. However, the specific embodiments and implementations discussed are merely illustrative and do not limit the scope of the disclosure. People skilled in the art should easily understand how to use the same principle for any other number of SSBs.

Figure 8:
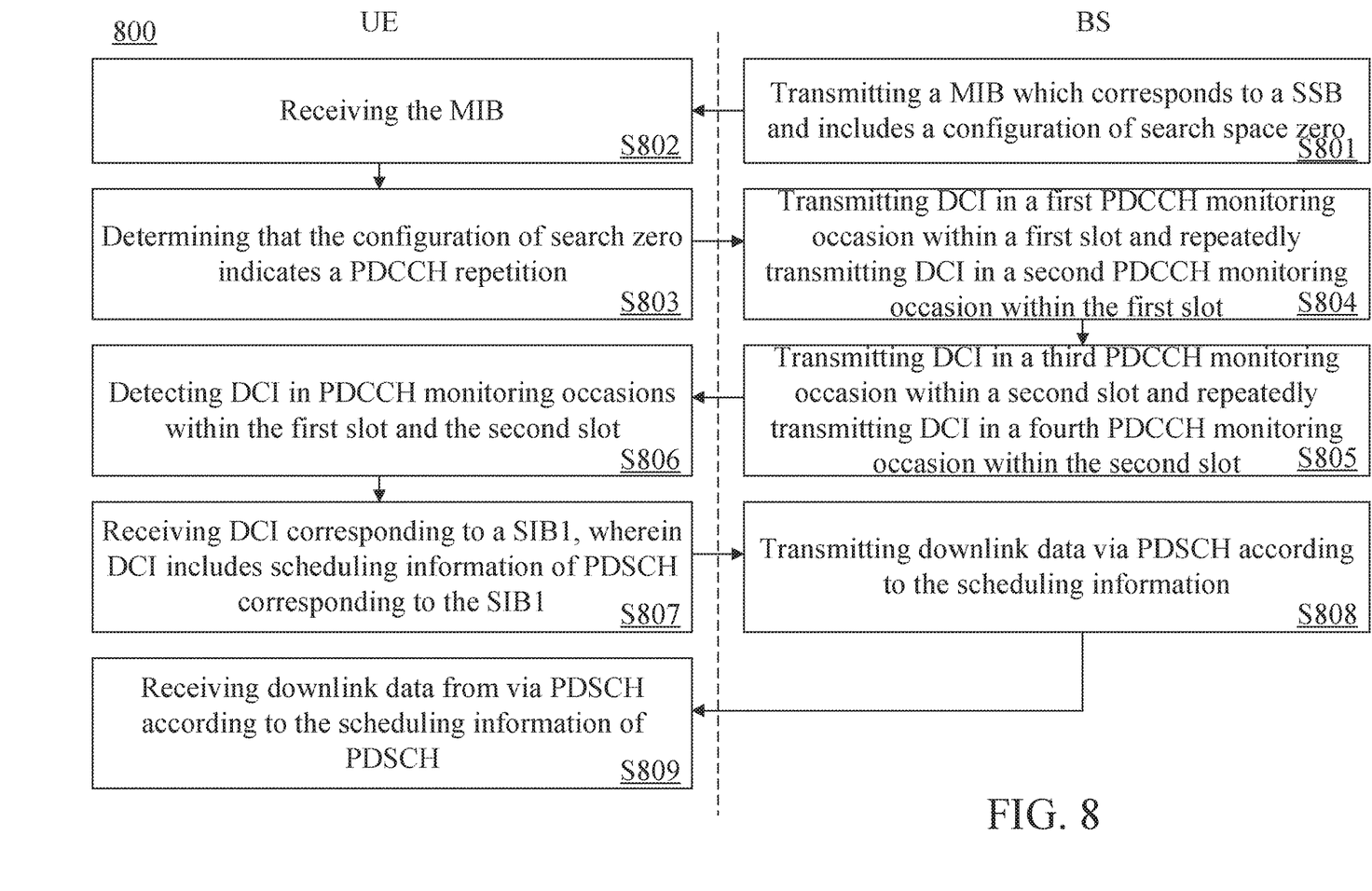
FIG. 8 illustrates flow chart of a method for wireless communications according to an embodiment of the present disclosure.

FIG. 8 illustrates a flow chart of a method for wireless communications in accordance with some embodiments of the present application. Referring to FIG. 8, method 800 is performed by a UE (e.g., UE 101) and a BS (e.g., BS 102) in some embodiments of the present application.

Operation S801 is executed to transmit, by BS, a MIB corresponding to a SSB to UE. The MIB includes a configuration of search space zero. Operation S802 is executed to receive, by UE, the MIB from BS. Operation S803 is executed to determine, by UE, that the configuration of search space zero indicates a PDCCH repetition.

Based on the configuration of search space zero indicating the PDCCH repetition, operation S804 is executed to transmit, by BS, DCI in a first PDCCH monitoring occasion within a first slot, and to repeatedly transmit, by BS, DCI in a second PDCCH monitoring occasion within the first slot. The second PDCCH monitoring occasion may follow the first PDCCH monitoring occasion.

Operation S805 is executed to transmit, by BS, DCI in a third PDCCH monitoring occasion within a second slot, and to repeatedly transmit, by BS, DCI in a fourth PDCCH monitoring occasion within the second slot. The fourth PDCCH monitoring occasion may follow the third PDCCH monitoring occasion. The second slot may immediately follow the first slot. Accordingly, operation S806 is executed to detect, by UE, DCI in the PDCCH monitoring occasions within the first slot and the second slot.

After detecting DCI, operation S807 is executed to receive, by UE, DCI corresponding to a SIB1 from BS. The DCI may include scheduling information of PDSCH corresponding to the SIB1. Operation S808 is executed to transmit, by BS, downlink data via PDSCH according to the scheduling information of PDSCH. Operation S809 is executed to receive, by UE, the downlink data via PDSCH according to the scheduling information of PDSCH.

In some implementations, the scheduling information may indicate that an index of a starting OFDM symbol is not less than 4. In some implementations, the scheduling information may comply with PDSCH time domain resource allocation corresponding to type B of PDSCH mapping type in a default PDSCH time domain resource allocation table. Further, type B of PDSCH mapping type in the default PDSCH time domain resource allocation table may support PDSCH duration of n number of OFDM symbols, where n is a natural number within 2 to 10. In some implementations, types of PDSCH mapping type of the default PDSCH time domain resource allocation table may consist of type B of PDSCH mapping type.

In some embodiments, BS may transmit at least one first SIB1, which corresponds to a first SSB, within an initial slot 'A' of a frame structure, and transmit at least one second SIB1, which corresponds to a second SSB, within an initial slot 'B' of another frame structure. In some implementation, a time offset may be between the initial slot 'A' and the initial slot 'B'. Further, the time offset between a starting OFDM symbol of the slot 'A' and a starting OFDM symbol of the slot 'B' may be N*20 ms, where N is a natural number.

Figure 9:
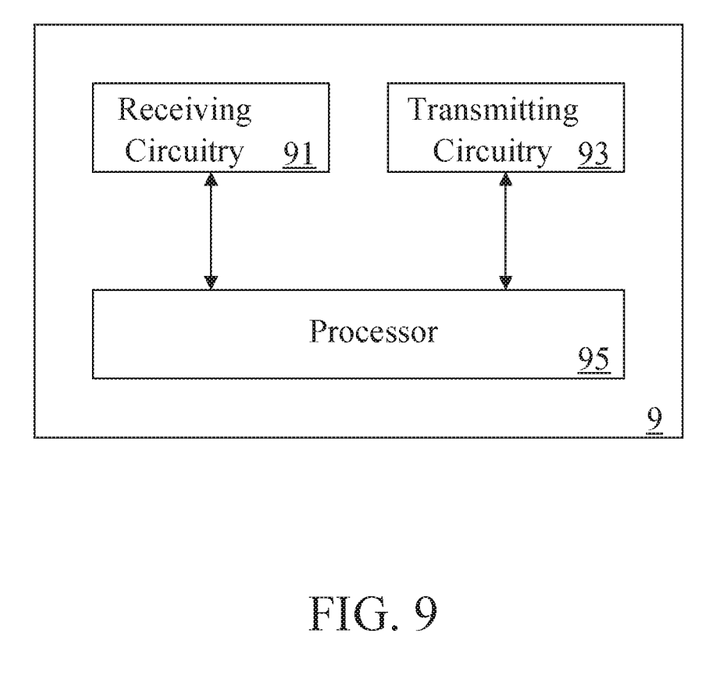
FIG. 9 illustrates an example block diagram of an apparatus according to an embodiment of the present disclosure.

FIG. 9 illustrates an example block diagram of an apparatus 9 according to an embodiment of the present disclosure.

As shown in FIG. 9, the apparatus 9 may include at least one non-transitory computer-readable medium (not illustrated in FIG. 9), a receiving circuitry 91, a transmitting circuitry 93, and a processor 95 coupled to the non-transitory computer-readable medium (not illustrated in FIG. 9), the receiving circuitry 91 and the transmitting circuitry 93. The apparatus 9 may be a user equipment or a base station.

Although in this figure, elements such as processor 95, transmitting circuitry 93, and receiving circuitry 91 are described in the singular, the plural is contemplated unless limitation to the singular is explicitly stated. In some embodiments of the present disclosure, the receiving circuitry 91 and the transmitting circuitry 93 are combined into a single device, such as a transceiver. In certain embodiments of the present disclosure, the apparatus 9 may further include an input device, a memory, and/or other components.

In some embodiments of the present disclosure, the non-transitory computer-readable medium may have stored thereon computer-executable instructions to cause a processor to implement the method with respect to the base station as described above. For example, the computer-executable instructions, when executed, cause the processor 95 interacting with receiving circuitry 91 and transmitting circuitry 93, so as to perform the operations with respect to BS depicted in FIGS. 1, 2 and 4.

In some embodiments of the present disclosure, the non-transitory computer-readable medium may have stored thereon computer-executable instructions to cause a processor to implement the method with respect to the user equipment as described above. For example, the computer-executable instructions, when executed, cause the processor 9 interacting with receiving circuitry 91 and transmitting circuitry 93, so as to perform the operations with respect to UE depicted in FIGS. 1, 2 and 4.

Those having ordinary skill in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

What is claimed is:

1. A user equipment (UE) for wireless communication, comprising:
    at least one memory; and
    at least one processor coupled with the at least one memory and operable to:
        receive a Master Information Block (MIB) corresponding to a Synchronization Signal Block (SSB) from a network equipment, wherein the MIB includes a configuration of search space zero;
        determine that the configuration of search space zero indicates a Physical Downlink Control Channel (PDCCH) repetition;
        receive Downlink Control Information (DCI) corresponding to a System Information Block 1 (SIB1) from the network equipment based on the configuration of search space zero, wherein the DCI includes scheduling information of Physical Downlink Shared Channel (PDSCH) corresponding to the SIB1; and
        receive downlink data via PDSCH according to the scheduling information of PDSCH.

2. The UE of claim 1, wherein the at least one processor is further operable to:
    detect the DCI in a first PDCCH monitoring occasion and a second PDCCH monitoring occasion following the first PDCCH monitoring occasion, wherein the first PDCCH monitoring occasion and the second PDCCH monitoring occasion are within a first slot.

3. The UE of claim 2, wherein the at least one processor is further operable to:
    detect the DCI in a third PDCCH monitoring occasion and a fourth PDCCH monitoring occasion following the third PDCCH monitoring occasion, wherein the third PDCCH monitoring occasion and the fourth PDCCH monitoring occasion are within a second slot immediately following the first slot.

4. The UE of claim 1, wherein the scheduling information indicates that an index of a starting Orthogonal Frequency Division Multiplexing (OFDM) symbol is not less than 4.

5. The UE of claim 1, wherein the scheduling information complies with PDSCH time domain resource allocation corresponding to type B of PDSCH mapping type in a default PDSCH time domain resource allocation table.

6. The UE of claim 5, wherein type B of PDSCH mapping type in the default PDSCH time domain resource allocation table supports PDSCH duration of n number of Orthogonal Frequency Division Multiplexing (OFDM) symbols, where n is a natural number within 2 to 10, and wherein one or more types of PDSCH mapping type of the default PDSCH time domain resource allocation table comprise type B of PDSCH mapping type.

7. The UE of claim 1, wherein the at least one processor is further operable to:
    detect the SIB1 within a first slot; and
    detect at least one second SIB1 within a second slot, wherein a time difference of N*20 milliseconds is between a starting Orthogonal Frequency Division Multiplexing (OFDM) symbol of the first slot and a starting OFDM symbol of the second slot, where N is a natural number.

8. The UE of claim 1, wherein the at least one processor is further operable to:
    detect the SIB1 within a first slot; and
    detect at least one second SIB1 within a second slot, wherein a time offset is between the first slot and the second slot.

9. The UE of claim 1, wherein a PDCCH candidate is associated with an aggregation level and a repetition number of the PDCCH repetition.

10. A network equipment for wireless communication, comprising:
    at least one memory; and
    at least one processor coupled with the at least one memory and operable to:
        transmit a Master Information Block (MIB) corresponding to a Synchronization Signal Block (SSB) to a user equipment (UE), wherein the MIB includes a configuration of search space zero for the UE to determine that the configuration of search space zero indicates a Physical Downlink Control Channel (PDCCH) repetition;
        transmit Downlink Control Information (DCI) corresponding to a System Information Block 1 (SIB1) to the UE based on the configuration of search space zero, wherein the DCI includes scheduling information of Physical Downlink Shared Channel (PDSCH) corresponding to the SIB1; and
        transmit downlink data via PDSCH according to the scheduling information of PDSCH.

11. The network equipment of claim 10, wherein the at least one processor is further operable to:
    transmit the DCI in a first PDCCH monitoring occasion and a second PDCCH monitoring occasion following the first PDCCH monitoring occasion, wherein the first PDCCH monitoring occasion and the second PDCCH monitoring occasion are within a first slot.

12. The network equipment of claim 11, wherein the at least one processor is further operable to:
    transmit the DCI in a third PDCCH monitoring occasion and a fourth PDCCH monitoring occasion following the third PDCCH monitoring occasion, wherein the third PDCCH monitoring occasion and the fourth PDCCH monitoring occasion are within a second slot immediately following the first slot.

13. The network equipment of claim 10, wherein the scheduling information indicates an index of a starting Orthogonal Frequency Division Multiplexing (OFDM) symbol is not less than 4.

14. The network equipment of claim 10, wherein the scheduling information complies with PDSCH time domain resource allocation corresponding to type B of PDSCH mapping type in a default PDSCH time domain resource allocation table.

15. The network equipment of claim 14, wherein type B of PDSCH mapping type in the default PDSCH time domain resource allocation table supports PDSCH duration of n number of Orthogonal Frequency Division Multiplexing (OFDM) symbols, where n is a natural number within 2 to 10, and wherein the default PDSCH time domain resource allocation table comprises type B of PDSCH mapping type.

16. The network equipment of claim 10, wherein the at least one processor is further operable to:
    transmit the SIB1 within a first slot; and
    transmit at least one second SIB1 within a second slot, wherein a time difference of N*20 milliseconds is between a starting Orthogonal Frequency Division Multiplexing (OFDM) symbol of the first slot and a starting OFDM symbol of the second slot, where N is a natural number.

17. The network equipment of claim 10, wherein the at least one processor is further operable to:
    transmit the SIB1 within a first slot; and
    transmit at least one second SIB1 within a second slot, wherein a time offset is between the first slot and the second slot, and wherein a PDCCH candidate is associated with an aggregation level and a repetition number of the PDCCH repetition.

18. A method performed by a user equipment (UE), comprising:
    receiving a Master Information Block (MIB) corresponding to a Synchronization Signal Block (SSB) from a network equipment, wherein the MIB includes a configuration of search space zero;
    determining that the configuration of search space zero indicates a Physical Downlink Control Channel (PDCCH) repetition;
    receiving Downlink Control Information (DCI) corresponding to a System Information Block 1 (SIB1) from the network equipment based on the configuration of search space zero, wherein the DCI includes scheduling information of Physical Downlink Shared Channel (PDSCH) corresponding to the SIB1; and
    receiving downlink data via PDSCH according to the scheduling information of PDSCH.

19. A method performed by a network equipment, comprising:
    transmitting a Master Information Block (MIB) corresponding to a Synchronization Signal Block (SSB) to a user equipment (UE), wherein the MIB includes a configuration of search space zero for the UE to determine that the configuration of search space zero indicates a Physical Downlink Control Channel (PDCCH) repetition;
    transmitting Downlink Control Information (DCI) corresponding to a System Information Block 1 (SIB1) to the UE based on the configuration of search space zero, wherein the DCI includes scheduling information of Physical Downlink Shared Channel (PDSCH) corresponding to the SIB1; and
    transmitting downlink data via PDSCH according to the scheduling information of PDSCH.

20. The method of claim 19, further comprising:
    transmitting the DCI in a first PDCCH monitoring occasion and a second PDCCH monitoring occasion following the first PDCCH monitoring occasion, wherein the first PDCCH monitoring occasion and the second PDCCH monitoring occasion are within a first slot.

* * * * *